United States Patent
Tran et al.

(10) Patent No.: US 10,254,380 B2
(45) Date of Patent: Apr. 9, 2019

(54) PATH SEGMENT MATCHING FOR WIRELESS INDOOR LOCATION APPLICATIONS

(71) Applicant: Cisco Technology, Inc., San Jose, CA (US)

(72) Inventors: Huy Phuong Tran, Portland, OR (US); Santosh G. Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/701,601

(22) Filed: Sep. 12, 2017

(65) Prior Publication Data
US 2019/0079159 A1    Mar. 14, 2019

(51) Int. Cl.
| | |
|---|---|
| *G01S 5/06* | (2006.01) |
| *G01C 21/20* | (2006.01) |
| *H04W 4/04* | (2009.01) |
| *H04W 4/02* | (2018.01) |
| *G01S 5/02* | (2010.01) |
| *H04W 64/00* | (2009.01) |

(52) U.S. Cl.
CPC .............. *G01S 5/06* (2013.01); *G01C 21/206* (2013.01); *H04W 4/023* (2013.01); *H04W 4/043* (2013.01); *G01S 5/0252* (2013.01); *H04W 64/003* (2013.01)

(58) Field of Classification Search
CPC ....... G01S 5/06; G01S 5/0252; G01C 21/206; H04W 4/043; H04W 4/023; H04W 64/003
See application file for complete search history.

(56) References Cited

U.S. PATENT DOCUMENTS

| | | |
|---|---|---|
| 8,320,939 B1 | 11/2012 | Vincent |
| 8,669,902 B2 | 3/2014 | Pandey et al. |
| 2006/0189324 A1* | 8/2006 | Anderson ............... G01S 19/48 455/456.1 |
| 2007/0001904 A1 | 1/2007 | Mendelson |
| 2010/0061427 A1 | 3/2010 | Lopez-Risueno et al. |
| 2012/0203453 A1 | 8/2012 | Lundquist et al. |

(Continued)

OTHER PUBLICATIONS

J. Krumm, et al., "Map Matching with Travel Time Constraints", Paper No. 2007-01-1102, SAE 2007 World Congress, Apr. 16-19, 2007, Detroit, MI, 11 pages.

(Continued)

*Primary Examiner* — Chuong A Ngo
(74) *Attorney, Agent, or Firm* — Edell, Shapiro & Finnan, LLC

(57) ABSTRACT

A method including obtaining location estimates of a wireless mobile device inside a structure based on wireless signals transmitted by the wireless mobile device and received at a plurality of wireless access points, wherein the inside of the structure is represented by a plurality of path segments; modeling a transition from a first estimated location of the wireless mobile device to a second estimated location of the wireless mobile device by minimizing a ratio of an angle to a length between the first estimated location and the second estimated location; selecting, based on the modeling a particular path segment of the plurality of path segments; and aligning the second estimated location of the mobile device to the particular path segment. An apparatus and a computer-readable storage media implementing the method are also disclosed.

20 Claims, 11 Drawing Sheets

(56) References Cited

U.S. PATENT DOCUMENTS

2013/0329598 A1* 12/2013 DiFazio .............. H04W 64/003
370/254
2013/0346217 A1 12/2013 Pandey et al.

OTHER PUBLICATIONS

P. Newson, et al., "Hidden Markov Map Matching Through Noise and Sparseness", Microsoft Research, Microsoft corporation, Proceedings of the 17th ACM SIGSPATIAL International Conference on Advances in Geographic Information Systems, Seattle, WA, Nov. 4-6, 2009, 8 pages.
Y. Lou, et al., "Map-Matching for Low-Sampling-Rate GPS Trajectories", ACM GIS '09, Nov. 4-6, 2009, Seattle, WA, 10 pages.
Z. Xiao, et al., "Lightweight Map Matching for Indoor Localisation using Conditional Random Fields", IPSN-14 Proceedings of the 13th International Symposium on Information Processing in Sensor Networks, Apr. 15-17, 2014, Berlin, Germany, 12 pages.

* cited by examiner

PATH SEGMENT MATCHING FOR WIRELESS INDOOR LOCATION APPLICATIONS

TECHNICAL FIELD

The present disclosure is related to estimating a location of the wireless mobile device location.

BACKGROUND

Users of wireless mobile devices, such as a cell phone, may want to use the cell phone's navigation capabilities to navigate an indoor structure, such as a retail store or airport. Additionally, operators of such structures may wish to provide location-based services to their customers using mobile devices. Examples of such services include geofencing and proximity marketing. However, global positioning system (GPS) signals for the mobile device within the indoor structure may be weak, which may cause the estimated location of the user within the indoor structure to be inaccurate. Moreover, a user's estimated location within the indoor structure may be subject to other sources of error, such as a low sampling rate and a high location latency.

Accordingly, there is a need for improving the accuracy of a mobile device's location within an indoor structure.

DESCRIPTION OF EXAMPLE EMBODIMENTS

Overview

Broadly, this disclosure is directed to more accurately estimating a location of a wireless mobile device within a structure, that is, for indoor location applications. The structure may be a building and may be represented as, or include, a plurality of path segments. The path segments may be joined to form pathways through the interior of the structure. The system of this disclosure may obtain a location estimate of a wireless mobile device within the structure using one or more wireless access points. After obtaining the location estimate of the mobile device, the system may model a transition from a first estimated location of the mobile device to a second estimated location of the mobile device. The system may model this transition by minimizing a ratio of an angle to a distance between the first estimated location and the second estimated. The model may use a Hidden Markov Model, which uses an emission probability and a transition probability. Based on this modeling, the system may then select a particular path segment from the plurality of path segments within the interior of the structure. The system may then align the second estimated location of the mobile device to the selected path segment.

Example Embodiments

Figure 1:
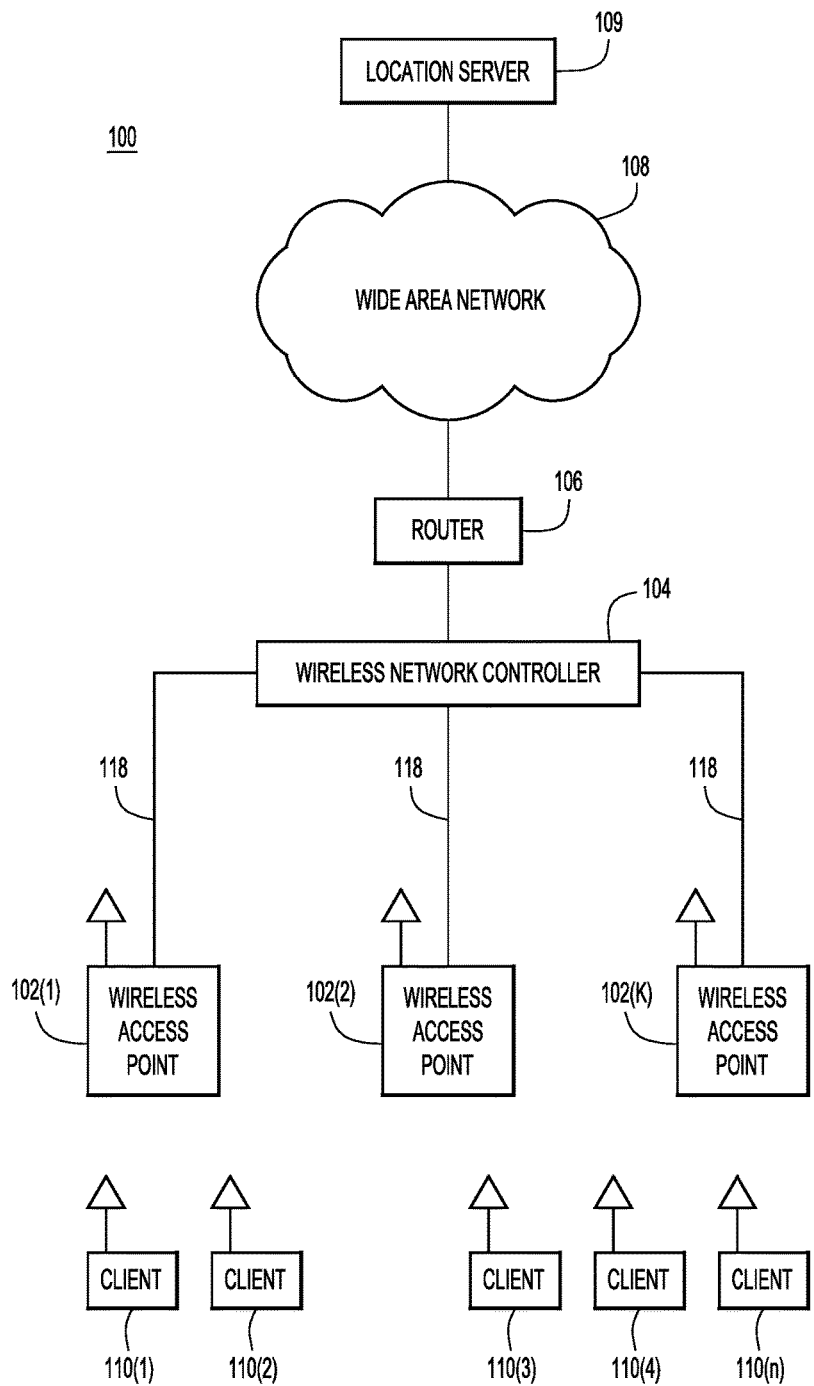
FIG. 1 is a block diagram showing an example of a wireless network in which the path segment matching techniques presented herein may be employed, according to an example embodiment.

Reference is first made to FIG. 1. FIG. 1 is a block diagram showing an example of a wireless network in which the path segment matching techniques of may be employed, according to an example embodiment. A wireless local access network (WLAN) 100 comprises a plurality of wireless access point devices ("wireless access points" or "wireless APs") 102(1)-102(k). Each of the wireless APs is configured to communicate over a wired or wireless mesh network connection with a wireless network controller device 104 ("wireless network controller," "wireless controller" or "controller device") that controls the APs 102(1)-102(k). The wireless network controller device 104 may, in turn, be configured to communicate with a router device 106 ("router") which may be connected to a wide area network (WAN) 108 (e.g., the Internet). The WLAN 100 may also have a plurality of wireless mobile device devices 110(1)-110(n) ("mobile devices" or "wireless client devices" or "clients").

The wireless APs 102(1)-102(k) are configured to wirelessly transmit traffic to and receive traffic from the mobile devices 110(1)-110(n) that they serve, e.g., according to the Institute of Electrical and Electronic Engineering (IEEE) 802.11 wireless local area network (WLAN) standard.

The mobile devices 110(1)-110(n) are mobile devices (e.g., mobile phones, tablets, computing devices, laptops, etc.) that may be configured to move about with respect to the wireless APs 102(1)-102(k) in the WLAN 100. For example, a human operator, using a mobile phone to access the WAN 108 via one of the wireless APs 102(1)-102(k) Thus, the location of the mobile devices 110(1)-110(n) may change as human operators/users of the clients move around.

The wireless network controller 104 is a network device that is configured to receive traffic (e.g., audio, video and/or any type of data communications) from the WAN 108 (via the router 106) and to deliver the traffic to the appropriate one of the wireless access points 102(1)-102(k) for ultimate delivery to the mobile devices. Thus, the wireless network controller 104 may be arranged in a local area network (LAN) with the wireless APs 102(1)-102(k). The LAN is shown in FIG. 1 at reference numeral 118 as connections (e.g., wired or wireless connections) between the wireless APs 102(1)-102(k) and the wireless network controller 104. For example, in FIG. 1, wireless APs 102(1)-102(k) are in communication with, and under control of, the wireless network controller 104, and thus, the wireless network controller 104 is configured to deliver traffic from the WAN 108 to wireless APs 102(1)-102(k) for ultimate wireless transmission to a client, and to receive traffic from clients and direct it to the WAN 108. Techniques for determining the location of one or more of the mobile devices 110(1)-110(n) may be performed by the wireless network controller 104 or by another processing device in the network 100, e.g., a mobility services engine, in communication with the wireless access points 102(1)-102(k) and/or the wireless network controller 104, and running on a location server 109 connected to the wide area network 108. For simplicity, the determination of client location is described as being performed by the location server 109, and it should be appreciated that the determination may be performed by other processing devices in the network 100 (such as the controller 104). The location server 109, in one example embodiment, is configured to perform the path segment matching techniques described herein.

The router 106 is a network device configured to enable communications to be routed from the WAN 108 to the wireless network controller 104 (e.g., for ultimate transmission to one or more of the wireless APs 102(1)-102(k) and one or more mobile devices 110(1)-110(n)). The router 106 also enables traffic to be routed from the wireless network controller 104 (e.g., received by one or more of the wireless APs 102(1)-102(k) and originating from one or more of the mobile devices 110(1)-110(n)) to the WAN 108.

It should be understood that even if a mobile device is not "associated" to an AP, it still will transmit a probe request on an occasional basis, in order to continuously be aware of a WLAN in its vicinity. The probe request received by an AP can be used for determination the location of the source mobile device that transmitted the probe request. Other signals that devices which operate in accordance with the IEEE 802.11 standard may be used to obtain information needed to compute the location of a client.

Figure 2:
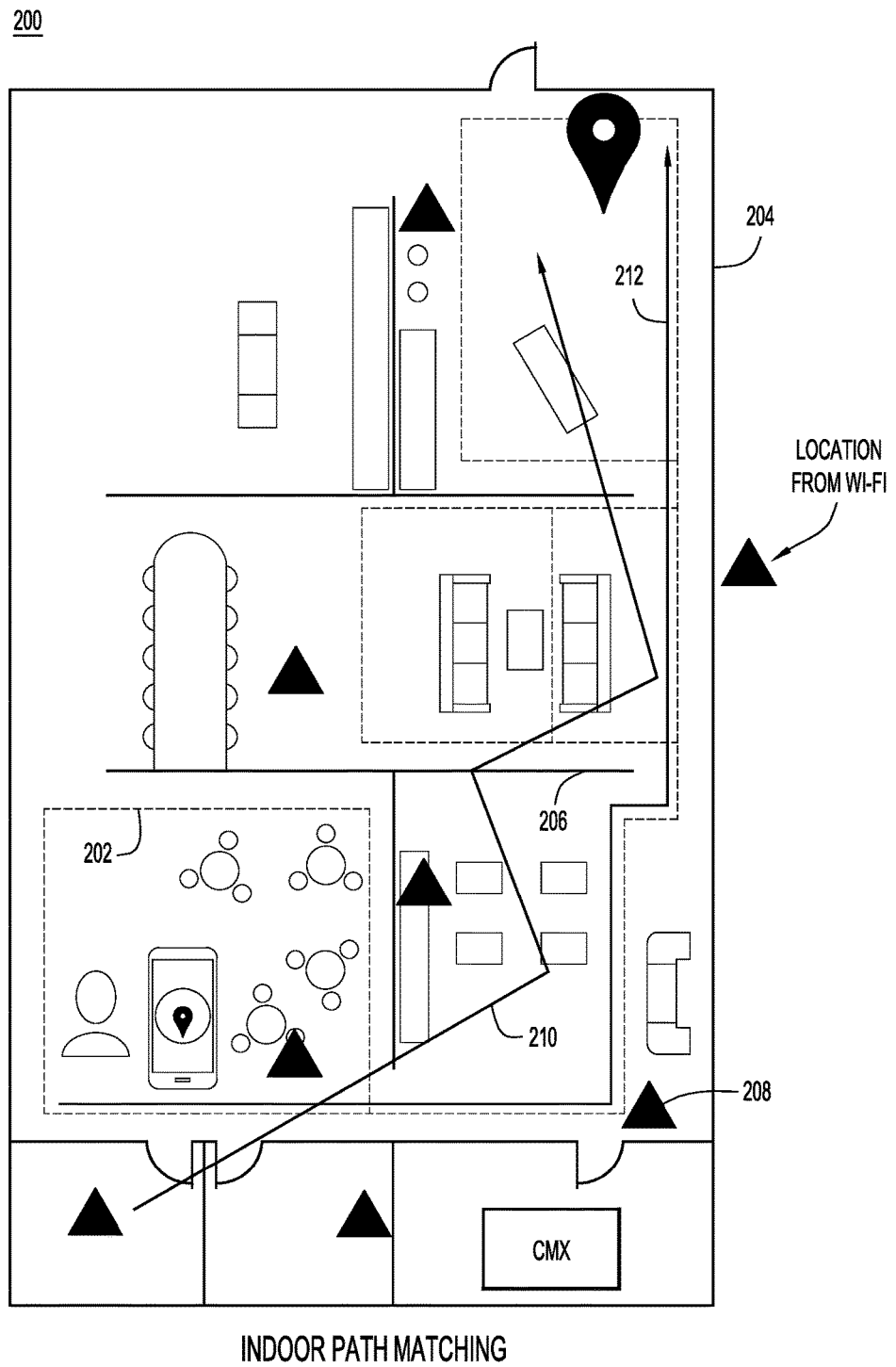
FIG. 2 is diagram illustrating an example of an indoor map including a plurality of path segments inside a structure for which the path segment matching techniques presented herein are used, according to an example embodiment.

Turning now to FIG. 2 an indoor map 200 is shown that includes a plurality of path segments 202 inside a structure 204 (e.g., a floor of a building), according to an example embodiment. For example, a map generation tool may be used to generate an interior layout of the structure 204, such as a store. The map generation tool may be used to generate boundaries 206 between areas in the structure 204, such as walls separating rooms. The map generation tool may also be used to generate one or more path segments 202 in the interior of the structure 204. For example, the one or more path segments 202 may be positioned so that the path segments 202 form a path from one end of the structure 204 to the other end of the structure 204. Such a path is shown as pathway 212. As shown in FIG. 2, the path segments 202 are in dashed lines. Boundaries 206 and other objects, such as furniture, are shown in solid line. The path segments 202 are indicative of various paths someone or something within the structure 204 may take to travel from one location to another within the structure 204. One of ordinary skill in the art would readily recognize that any number of path segments 202 may be generated in the interior of the structure 204. Additionally, one of ordinary skill in the art would also recognize that path segments 202 that are not straight, such as curved, may also be generated.

Also shown in FIG. 2 are raw locations 208 of a mobile device 110(i) represented by the triangles, each triangle corresponding to a raw location 208 of the mobile device 110 at a given instance of time. The raw locations 208 of the mobile device 110 may be collected using any suitable system or apparatus, such as the wireless network 100 of FIG. 1.

A goal of the path segment matching techniques of the present disclosure is to determine a best path segment to which a location of the mobile device 110 should be aligned. In some aspects of the techniques, a location of the mobile device 110 may be assigned to the best path segment. For example, FIG. 2 shows two pathways 210 and 212 based on the raw locations 208 of the mobile device 110. Pathway 212 is the pathway generated according to the techniques of this disclosure while pathway 210 is the pathway generated using different techniques. The advantage of the techniques of this disclosure are readily apparent. Pathway 210 shows a traveled path that is physically impossible in some parts and unlikely in other parts. For example, pathway 210 travels through walls, a physical impossibility. Additionally, pathway 210 travels over furniture, which is an unlikely path. On the other hand, pathway 212 shows a traveled path that does not go through walls 206 or furniture. Instead, pathway 212 follows a plurality of path segments 202 generated by the map generation tool.

Figure 3:
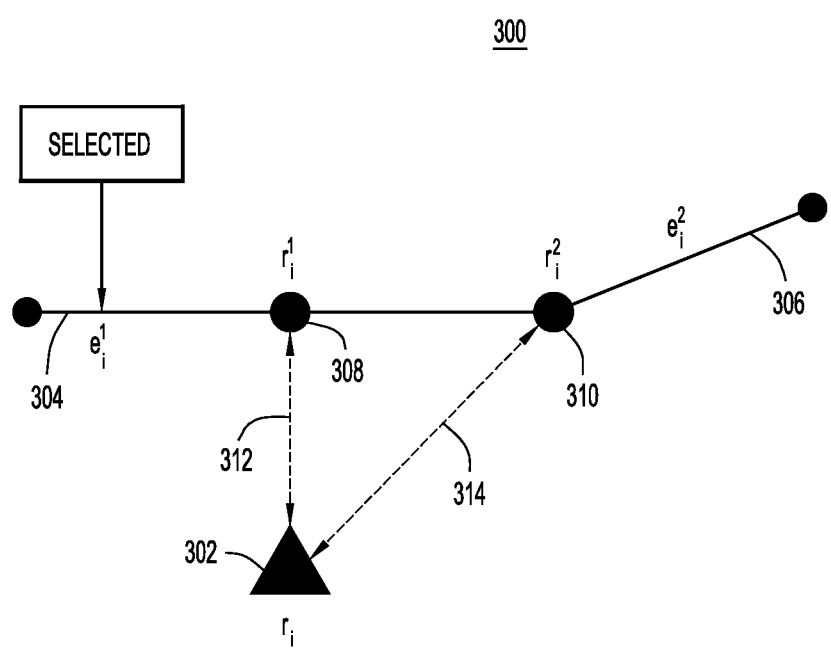
FIG. 3 is a simplified, high-level diagram showing an example of path segment matching techniques, according to an example embodiment.

FIG. 3 is diagram 300 showing at a simplified, high-level diagram of the path segment matching techniques, according to an example embodiment. In FIG. 3, the raw location 302 of the mobile device 110 is represented by triangle $r_i$ and two of the generated path segments are represented by $e_i^1$ 304 and $e_i^2$ 306. The two generated path segments $e_i^1$ 304 and $e_i^2$ 306 each have a point that is closest to the raw location $r_i$ 302 of the mobile device 110. According to one example embodiment, the path segment matching techniques of this disclosure may select a path segment closest to raw location $r_i$ 302. To do so, the path segment matching techniques may determine which of path segments $e_i^1$ 304 and $e_i^2$ 306 is closest to raw location $r_i$ 302 by computing distances 312, 314, such as a Euclidean distance, between raw location $r_i$ 302 and the closest points $r_i^1$ 308 and $r_i^2$ 310 on the two path segments $e_i^1$ 304 and $e_i^2$ 306, respectively. Here, since raw location $r_i$ 302 is closer to $r_i^1$ 308, the selected path segment is $e_i^1$ 304. Once the path segment $e_i^1$ 304 is selected, the techniques of this disclosure may align raw location $r_i$ with the path segment $e_i^1$ 304. In another aspect, the path segment matching techniques may assign the raw location $r_i$ with the path segment $e_i^1$ 304. In this manner, path segment matching according to the techniques of this disclosure may be performed. One of ordinary skill in the art would readily recognize that any method may be used to determine the distances 312, 314 between raw location $r_i$ 302 and the closest points $r_i^1$ 308 and $r_i^2$ 310.

Figure 4A:
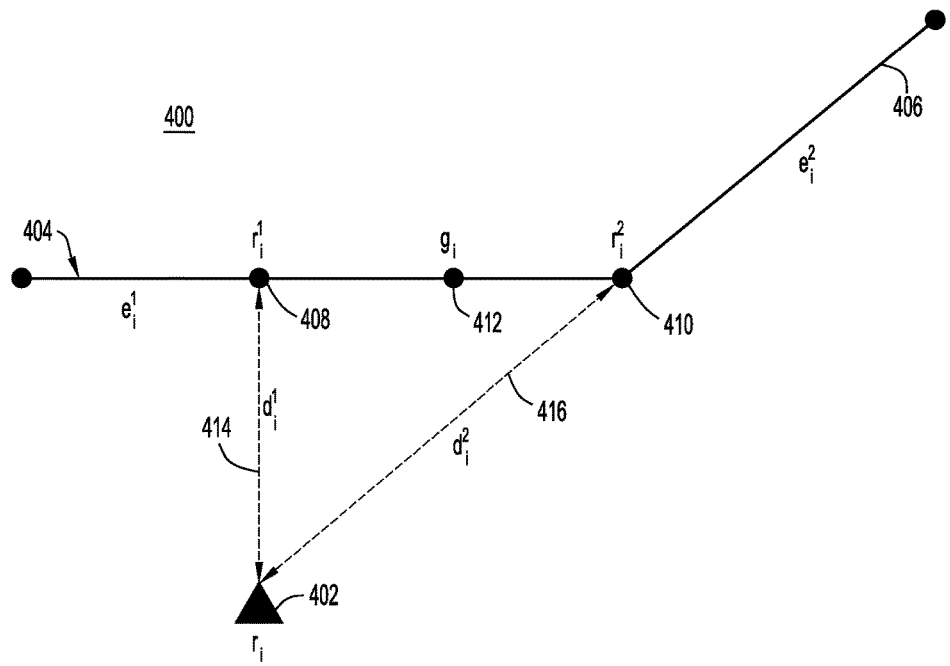
FIGS. 4A and 4B are diagrams showing determination of an emission probability and its use in path segment matching, according to an example embodiment.
Figure 4B:
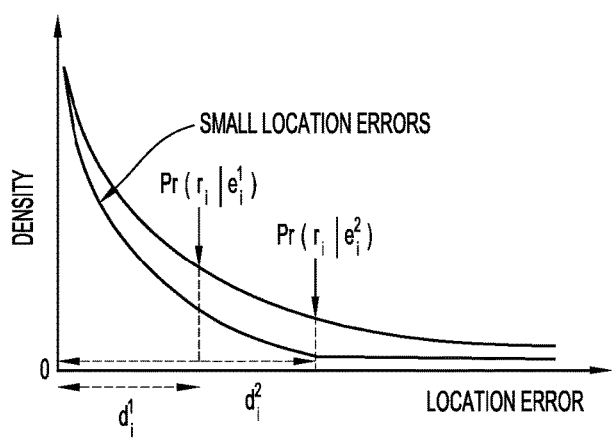

FIGS. 4A and 4B are diagrams 400, 450 showing determination and use of an emission probability as part of the path segment matching techniques, according to an example embodiment. The emission probability is the likelihood of observing the raw location $r_i$, of the mobile device 110 on a given path segment 202. In one aspect of this disclosure, the system may maximize the emission probability, along with the transition probability, explained below, to determine the most likely location of the raw location $r_i$.

FIG. 4A shows two path segments $e_i^1$ 404 and $e_i^2$ 406, the raw location $r_i$ 402 of the mobile device 110, and the actual location $g_i$ 412 of the mobile device 110. FIG. 4B shows a probability distribution function 450 with a probability density that depends on the distance between the raw location $r_i$ of the mobile device 110 and the two path segments $e_i^1$ 404 and $e_i^2$ 406. Before the path segment matching techniques of this disclosure are invoked, training data may be used to estimate a location error distribution. This may then be used to generate the probability density function, such as the probability distribution function 450 in FIG. 4B.

The errors $d_i^1$ 414 and $d_i^2$ 416 between the raw location $r_i$ 402 of the mobile device 110 and the closest points $r_i^1$ 408 and $r_i^2$ 410 on each of the two path segments $e_i^1$ 404 and $e_i^2$ 406 may be determined as described above with respect to FIG. 3. After these errors $d_i^1$ 414 and $d_i^2$ 416 are determined, the system may then use the errors $d_i^1$ 414 and $d_i^2$ 416 in conjunction with the probability distribution function 450 of FIG. 4B to determine which path segment $e_i^1$ 404, $e_i^2$ 406 the mobile device 110 is on. As shown in FIG. 4B, the error $d_i^1$ 414 is smaller than the error $d_i^2$ 416. The probability distribution function 450 of FIG. 4B is a decreasing exponential function. Therefore, as the error between the raw location $r_i$ 402 of the mobile device 110 and a closest point on a path segment increases, the less likely the raw location $r_i$ 402 of the mobile device 110 is on a particular path segment. Here, since the error $d_i^1$ 414 is smaller than the error $d_i^2$ 416, the path segment matching technique determines that, for the emission probability, the path segment $e_i^1$ 404 more likely matches the actual location $g_i$ 412 of the mobile device 110. One of ordinary skill in the art would readily recognize that any probability distribution function may be generated and used.

Figure 5A:
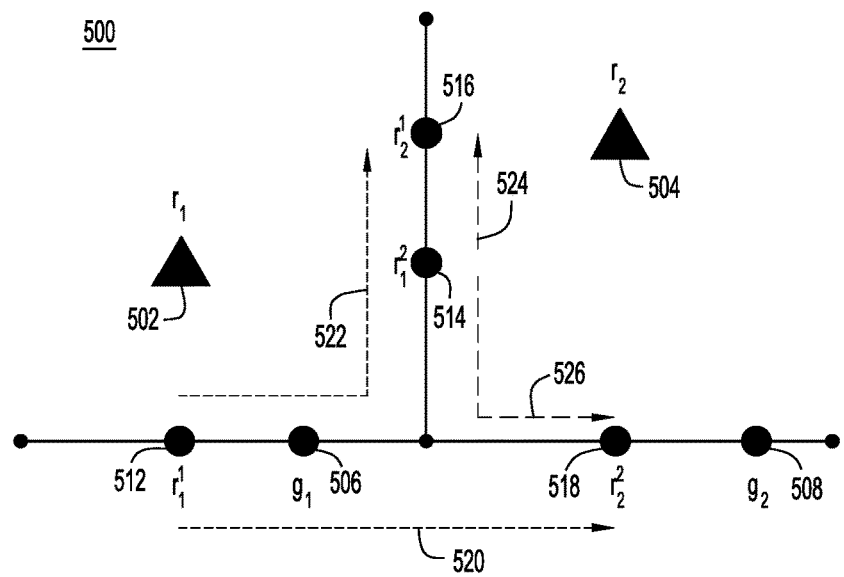
FIGS. 5A and 5B are diagrams showing determination of a transition probability using a traveling distance constraint and its use in path segment matching, according to an example embodiment.
Figure 5B:
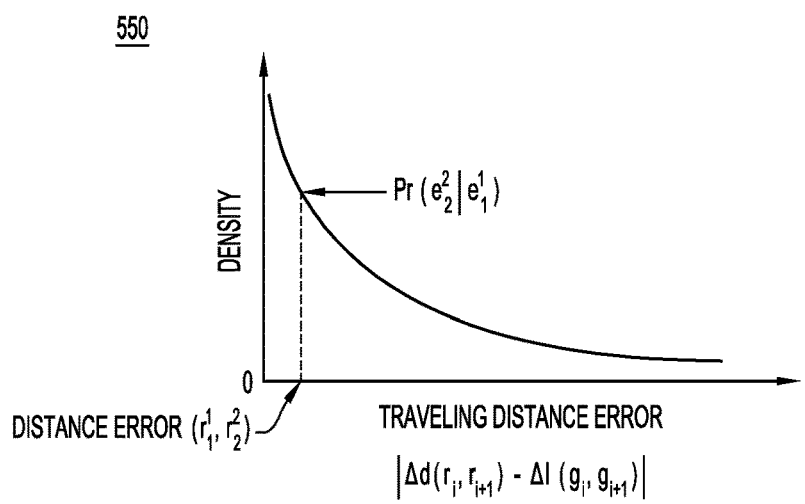

FIGS. 5A and 5B are diagrams 500, 550 showing determination and use of a transition probability using a traveling distance constraint, according to an example embodiment. The transition probability is the probability of transitioning from a current path segment to the next path segment. In one aspect of this disclosure, the system may maximize the transition probability. The transition probability may be used in conjunction with the emission probability to determine the path segment that most likely matches the mobile device's actual location.

FIG. 5A shows two consecutive raw locations $r_1$ 502 and $r_2$ 504 of the mobile device 110 and the associated actual locations $g_1$ 506 and $g_2$ 508 of the mobile device 110. This aspect of the path segment matching techniques of this disclosure uses a travel distance constraint to estimate the location of the mobile device 110. The travel distance constraint operates on the observation that a distance between consecutive raw locations $r_1$ 502 and $r_2$ 504 of the mobile device 110 is similar to the distance 520 of a path between the corresponding actual locations $g_1$ 506 and $g_2$ 508 of the mobile device 110. Accordingly, in this aspect of the path segment matching techniques, the estimated path is the shortest path whose distance is most similar to the difference between consecutive raw locations $r_1$ 502 and $r_2$ 504 of the mobile device 110.

FIG. 5A also shows the projections of $r_1$ 502 and $r_2$ 504 on the closest path segments. The projections of $r_1$ 502 are represented by $r_1^1$ 512 and $r_2^2$ 514 and the projections of $r_2$ 504 are represented by $r_2^1$ 516 and $r_2^2$ 518. Four path segments 520, 522, 524, 526 are shown as dashed lines. Path segment 520 begins at $r_1^1$ 512 and ends at $r_2^2$ 518. Path segment 522 begins at $r_1^1$ 512 and ends at $r_2^1$ 516. Path segment 524 begins at $r_1^2$ 514 and ends at $r_2^1$ 516. Path segment 526 begins at $r_1^2$ 514 and ends at $r_2^2$ 518. In one aspect, the path segment matching techniques may determine which of the four segments is the shortest path whose travel distance is most similar to the travel distance between the two raw locations $r_1$ 502 and $r_2$ 504 of the mobile device 110 as determined above. These travel distance errors may then be used to determine the most likely path segment using the probability distribution function 550 of FIG. 5B.

Here, as described in previous figures, a distance, such as a Euclidean distance, between the two consecutive raw locations $r_1$ 502 and $r_2$ 504 is determined. This distance may then be used in the probability distribution function 550 shown in FIG. 5B. In the probability distribution function 550 shown in FIG. 5B, the probability density depends on the traveling distance error. The shortest path segment whose length is most similar to the distance between raw measurements has the highest probability density of being the correct path segment. Therefore, the shortest path segment whose length is most similar is selected as the correct path segment based on the traveling distance constraint.

Figure 6A:
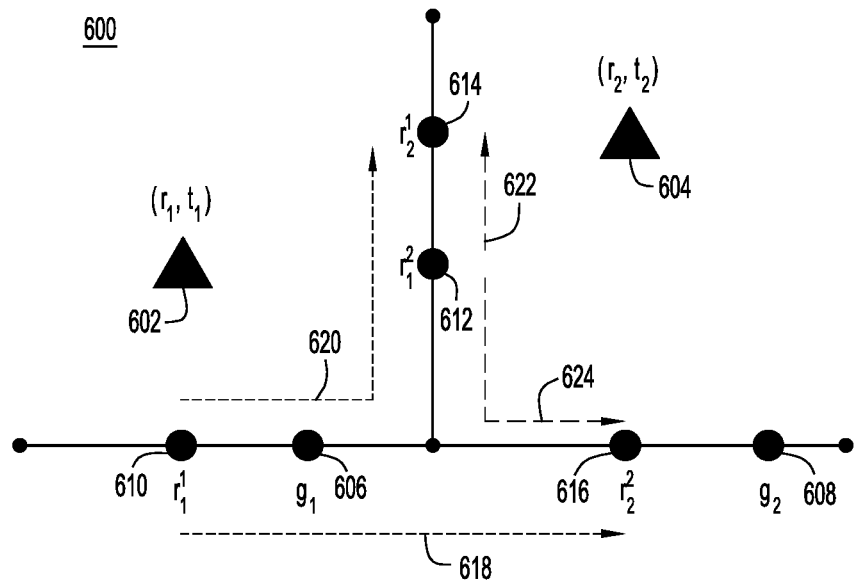
FIGS. 6A and 6B are diagrams showing determination of a transition probability using a traveling time constraint and its use in path segment matching, according to an example embodiment.
Figure 6B:
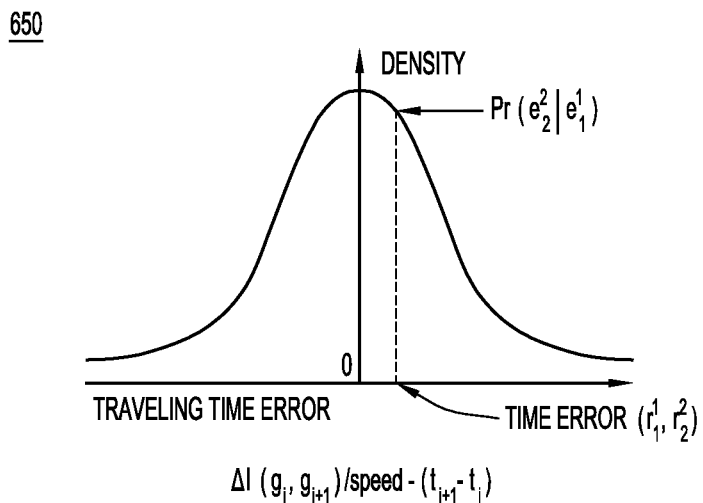

FIGS. 6A and 6B are diagrams 600, 650 showing determination and use of a transition probability using a traveling time constraint, according to an example embodiment. The travel time constraint may be used in place of, or in conjunction with, the travel distance constraint as described above with reference to FIGS. 5A and 5B. This aspect of the path segment matching techniques uses a travel time constraint to estimate the location of the mobile device 110. The travel time constraint operates on the observation that the time required for traveling between two consecutive actual locations is similar to the difference between the timestamps of the corresponding raw locations. Therefore, applying the travel time constraint results in selecting the shortest path whose estimated travel time is most similar to the difference of the timestamps of the two consecutive raw locations. Prior to deploying the path segment techniques, experimental data may be used to determine an average speed of a user carrying the mobile device 110. This average speed may then be used to determine the travel time by dividing the travel distance by the average speed.

FIG. 6A shows two consecutive raw locations $r_1$ 602 and $r_2$ 604 of the mobile device 110 at times $t_1$ and $t_2$ and the associated actual locations $g_1$ 606 and $g_2$ 608 of the mobile device 110. The actual locations $g_1$ 606 and $g_2$ 608 each have an associated timestamp. The path segment matching techniques determine the time difference between the two associated timestamps of the raw locations $r_1$ 602 and $r_2$ 604. This time difference is used as described below.

FIG. 6A also shows the projections of $r_1$ and $r_2$ and times $t_1$ and $t_2$ on the closest path segments. The projections of $r_1$ 602 are represented by $r_1^1$ 610 and $r_1^2$ 612 and the projections of $r_2$ 604 are represented by $r_2^1$ 614 and $r_2^2$ 616. Four path segments 618, 620, 622, 624 are shown as dashed lines. Path segment 618 begins at $r_1^1$ 610 and ends at $r_2^2$ 616. Path segment 620 begins at $r_1^1$ 610 and ends at $r_2^1$ 614. Path segment 622 begins at $r_1^2$ 612 and ends at $r_2^1$ 614. Path segment 624 begins at $r_1^2$ 612 and ends at $r_2^2$ 616. In one aspect of this disclosure, the map matching technique may determine which of the four segments is the shortest path whose travel time is most similar to the travel time between the timestamps as determined above. These travel time errors may then be used to determine the most likely path segment using the probability distribution function 650 of FIG. 6B.

Figure 7A:
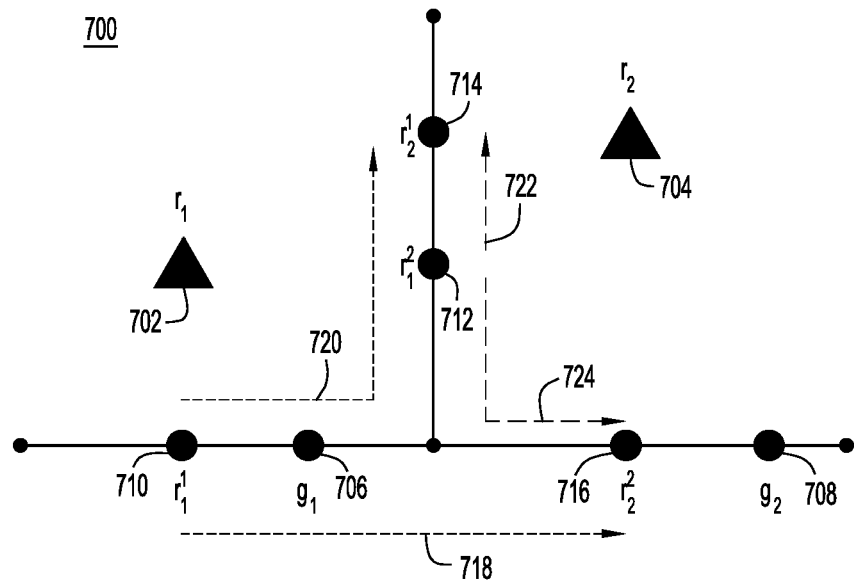
FIGS. 7A and 7B are diagrams showing determination of a transition probability using a ratio between an angle and a traveling distance and its use in path segment matching, according to an example embodiment.
Figure 7B:
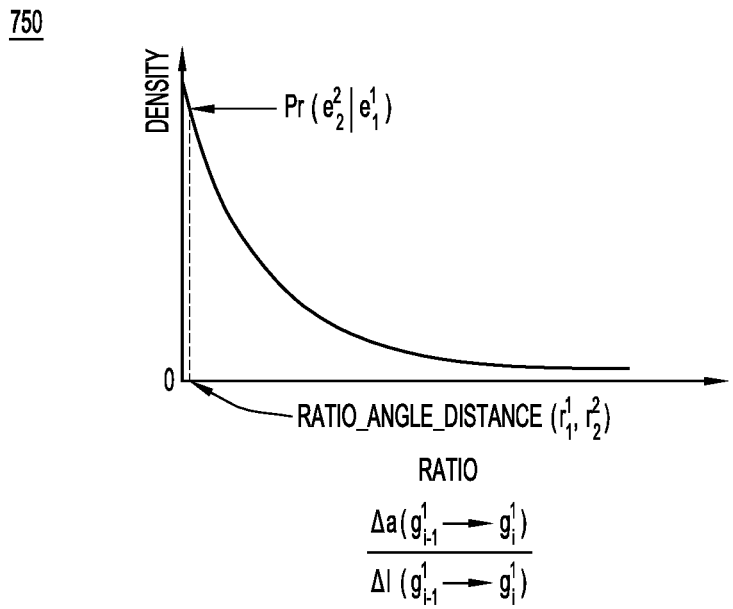

FIGS. 7A and 7B are diagrams 700, 750 showing determination and use of a transition probability using a ratio between an angle and a traveling distance, according to an example embodiment. The ratio between an angle and a traveling distance constraint may be used in place of, or in conjunction with, the travel distance and travel time constraints as described above with reference to FIGS. 5A, 5B, 6A, and 6B. This aspect of the path segment matching techniques uses a ratio of a total angle in the path between two consecutive actual locations to the distance between the two consecutive actual locations. The ratio between an angle and a traveling distance constraint operates on the observation that the total angle in the path between two consecutive actual locations increases slightly with the length of the path. In other words, the ratio between the total angle and the distance between two consecutive locations is small.

FIG. 7A shows two consecutive raw locations $r_1$ 702 and $r_2$ 704 of the mobile device 110 and the associated actual locations $g_1$ 706 and $g_2$ 708 of the mobile device 110. FIG. 7A also shows the projections of $r_1$ 702 and $r_2$ 704 on the closest path segments. The projections of $r_1$ 702 are represented by $r_1^1$ 710 and $r_1^2$ 712 and the projections of $r_2$ 704 are represented by $r_2^1$ 714 and $r_2^2$ 716. Four path segments 718, 720, 722, 724 are shown as dashed lines. Path segment 718 begins at $r_1^1$ 710 and ends at $r_2^2$ 716. Path segment 720 begins at $r_1^1$ 710 and ends at $r_2^1$ 714. Path segment 722 begins at $r_1^2$ 712 and ends at $r_2^1$ 714. Path segment 724 begins at $r_1^2$ 712 and ends at $r_1^2$ 712. In one aspect, the path segment matching techniques may determine which of the four segments is the path that has the smallest ratio between the angle and the length of the path. These ratios may then be used to determine the most likely path segment using the probability distribution function 750 of FIG. 7B.

Figure 8:
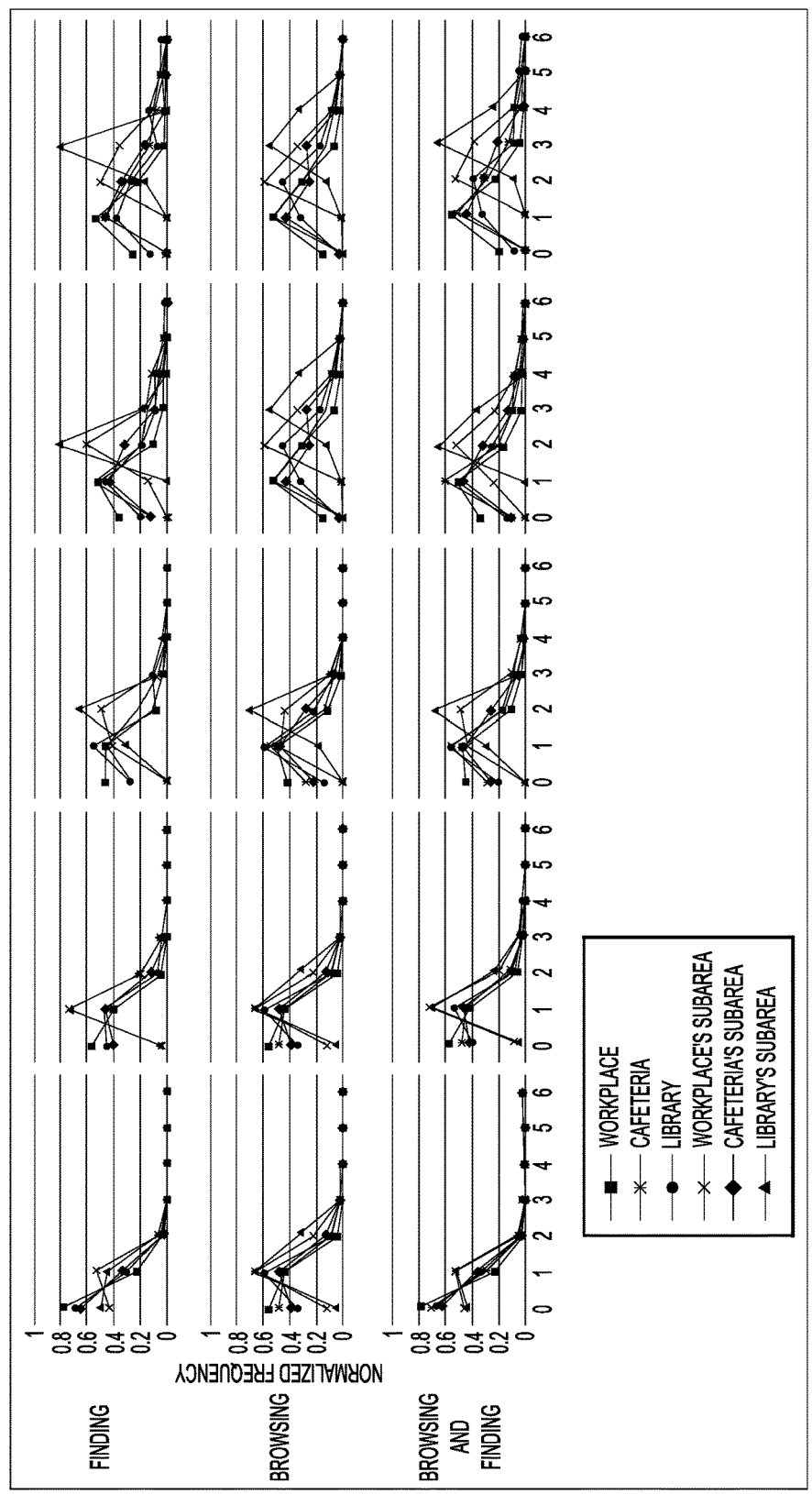
FIG. 8 illustrates a plurality of graphs showing a number of turns taken over a distance traveled during various wireless mobile device user activities, according to an example embodiment.

FIG. 8 is a plurality of graphs 800 showing a number of turns taken over a distance traveled during various activities, according to an example embodiment. In one aspect of this disclosure, a number of turns may be used as part of the ratio between an angle and a travelling distance constraint determination. For example, an experimental dataset may be obtained to improve the accuracy of this constraint. The graphs 800 of FIG. 8 show a number of turns people take after walking 5 m, 10 m, 15 m, 20 m, and 25 m. People walked in a variety of settings, such as a workplace, a cafeteria, a library, a workplace subarea, a cafeteria subarea, and a library subarea. Additionally, the users were given various tasks, such as finding, browsing, or browsing and finding. An observation from this data is that sample distributions in large areas are similar regardless of different settings, dimensions, and visiting purposes, i.e., finding or browsing. For smaller areas, such as the various subareas, the sample distributions vary from the sample distributions of larger areas. The smaller area distributions also vary slightly when the walking distance increases.

Using the data in FIG. 8, one aspect of the path segment matching techniques constrains the number of turns in the shortest path between two aligned location estimates. For example, the number of turns at different walking distances from one meter to a maximum distance may be sampled. Sample frequencies at each walking distance may also be extracted. Given the length of the shortest path and the number of turns in the path, the techniques may determine a normalized frequency of the number of turns. The maximum distance is the maximum length of the shortest paths.

Figure 9:
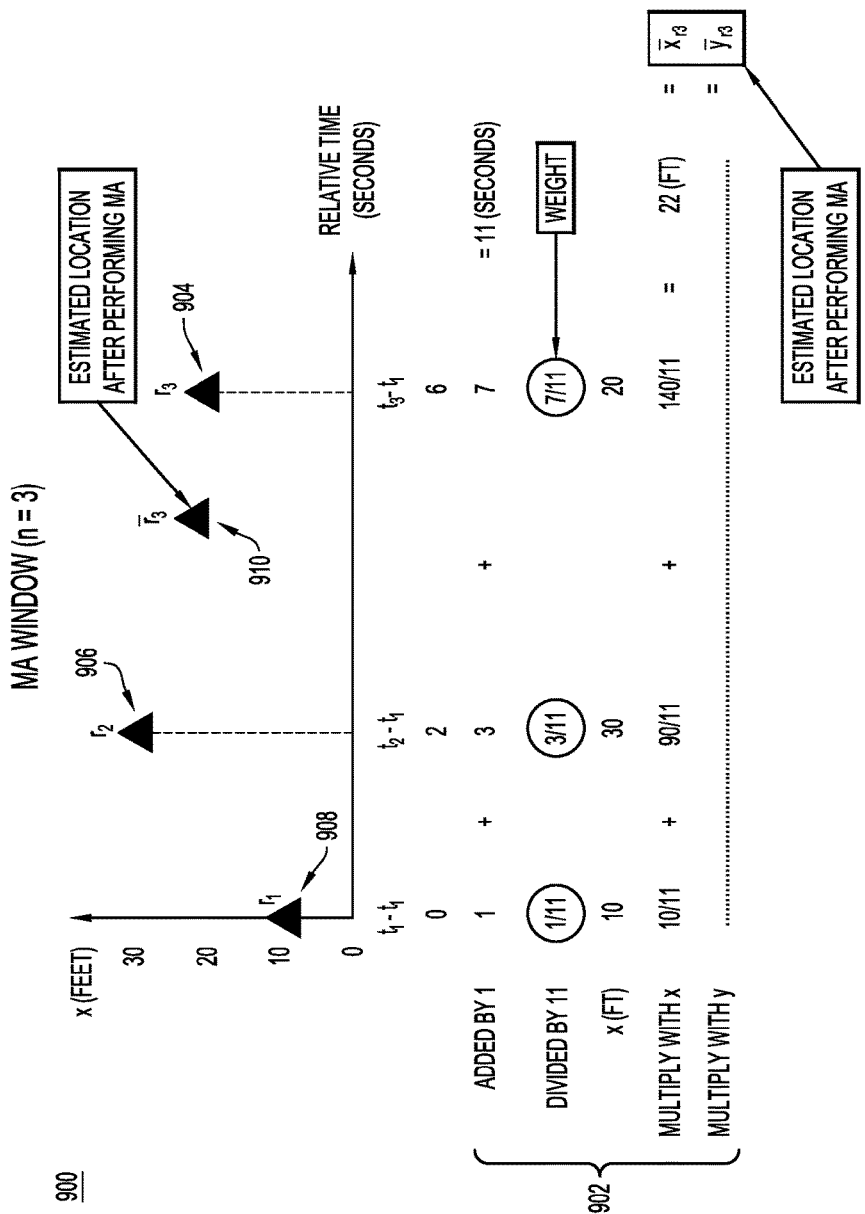
FIG. 9 depicts a smoothing window and an algorithm for smoothing a location estimate as part of the path segment matching, according to an example embodiment.

FIG. 9 shows a smoothing window 900 and an algorithm 902 for smoothing a raw location estimate, according to an example embodiment. In one aspect of this disclosure, the smoothing window 900 may be used to increase the accuracy of the raw location of the mobile device 110. As shown in FIG. 9, the smoothing window 900 uses a time-based moving average to smooth the raw location of the mobile device 110. For example, in FIG. 9, the size of the smoothing window 900 is three. In other words, the raw location of the mobile device 110 at a current time is based not only on the raw location of the mobile device 110 at the current time, but also on the two raw locations at two previous time instances. In FIG. 9, the raw location of the current device is denoted by $r_3$, which has a location of twenty feet. The previous two locations are denoted as $r_1$ and $r_2$ with locations of 10 feet and 30 feet, respectively. In this example, the earliest location $r_1$ is assumed to have taken place at time zero, raw location $r_2$ was two seconds after the time of $r_1$, and raw location $r_3$ was six seconds after the time of $r_1$. To estimate the location of $r_3$, the total time is calculated. In the example shown in FIG. 9, the total time is 11 seconds. This is arrived at by adding one to the raw times (zero seconds, two seconds, and six seconds) of the raw locations and summing those times. To weight the moving average, the sample times are divided by the total time. This division results in the most recent raw location, in this case $r_3$, receiving the greatest weight, here 7/11. The weights are then multiplied by the respective distances of the raw locations. For example, $r_1$ was at 10 feet with a weight of 1/11. To determine $r_1$'s contribution to the smoothed, raw location of $r_3$, the raw location of $r_1$ (10 feet) is multiplied by the weight of $r_1$ (1/11) with a result of 10/11. This is repeated for locations $r_2$ and $r_3$, with a determination that the smoothed, raw location of $r_3$ is 22 feet. The smoothed, raw location is denoted as $\bar{r}_3$. A similar process may then be repeated in the y direction to determine a smoothed, raw location in the x and y directions.

Figure 10:
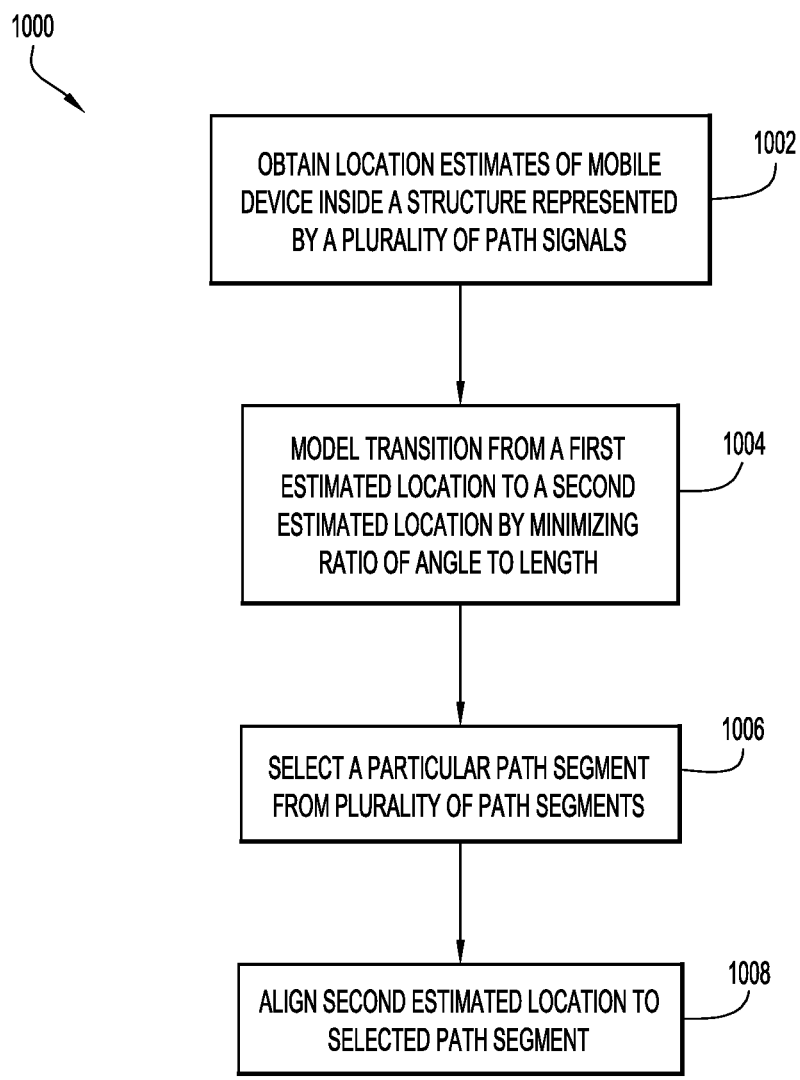
FIG. 10 is a high-level flowchart depicting the operations of the path segment matching techniques, according to an example embodiment.

FIG. 10 is a high-level flowchart 1000 of the path segment matching techniques, according to an example embodiment. The method may begin at 1002. At 1002, the system may obtain location estimates of the mobile device inside the structure. The location estimates may be based on one or more wireless signals transmitted by the mobile device. The one or more wireless signals may be received at one or more wireless access points. Additionally, the inside of the structure may be represented as a plurality of path segments. The plurality of path segments may be positioned as to form paths through the structure. After completing operation 1002, the method 1000 proceeds to operation 1004.

At 1004, the system may model a transition from a first estimated location of the mobile device to a second estimated location. The system may model this transition in a number of ways. For example, in one aspect of this disclosure, the system may attempt to minimize the ratio between an angle to a length between the first estimated location and the second estimated location, as described above with respect to, for example, FIGS. 7A and 7B. In other aspects of this disclosure, the system may use a travel distance constraint, such as that described above with respect to FIGS. 5A and 5B. In yet other aspects of this disclosure, the system may use a travel time constraint, such as that described above with respect to FIGS. 6A and 6B. After operation 1004 is completed, the method 1000 may proceed to operation 1006.

At operation 1006, the system may select a particular path segment from the plurality of path segments that represent the inside of the structure. After operation 1006 is completed, the method 1000 may proceed to operation 1008.

At operation 1008, the method may align the second estimated location of the mobile device to the particular path segment. The method 1000 may then end.

In one aspect, the path segment matching techniques may model the transition using a travel distance constraint to determine a length of the shortest path between the first estimated location and the second estimated location to estimate an actual distance traveled by the wireless mobile device.

In another aspect, the path segment matching techniques may model the transition using a travel time constraint to determine a length of time between the first estimated location and the second estimated location and using the length of time to estimate an actual distance traveled by the wireless mobile device.

In one aspect, the path segment matching techniques may smooth the location estimate using a time-based moving average. For example, the path segment matching techniques may smooth the location estimate using location estimates within a smoothing window, wherein the location estimates comprise an associated timestamp.

In one aspect, the path segment matching techniques may weight a previous location estimate within the smoothing window based on temporal proximity to a current time.

In another aspect, the path segment matching techniques may model the transition by generating an emission probability representing a probability that the wireless mobile device is on a first path segment of the plurality of path segments and a transition probability representing a probability that the wireless mobile device transitions from the first path segment to a second path segment; and maximizing the emission probability and the transition probability.

In another aspect, the path segment matching techniques may model the transition by minimizing the ratio of the angle to the length by constraining a number of turns in a shortest path between the first estimated location and the second estimated location.

Figure 11:
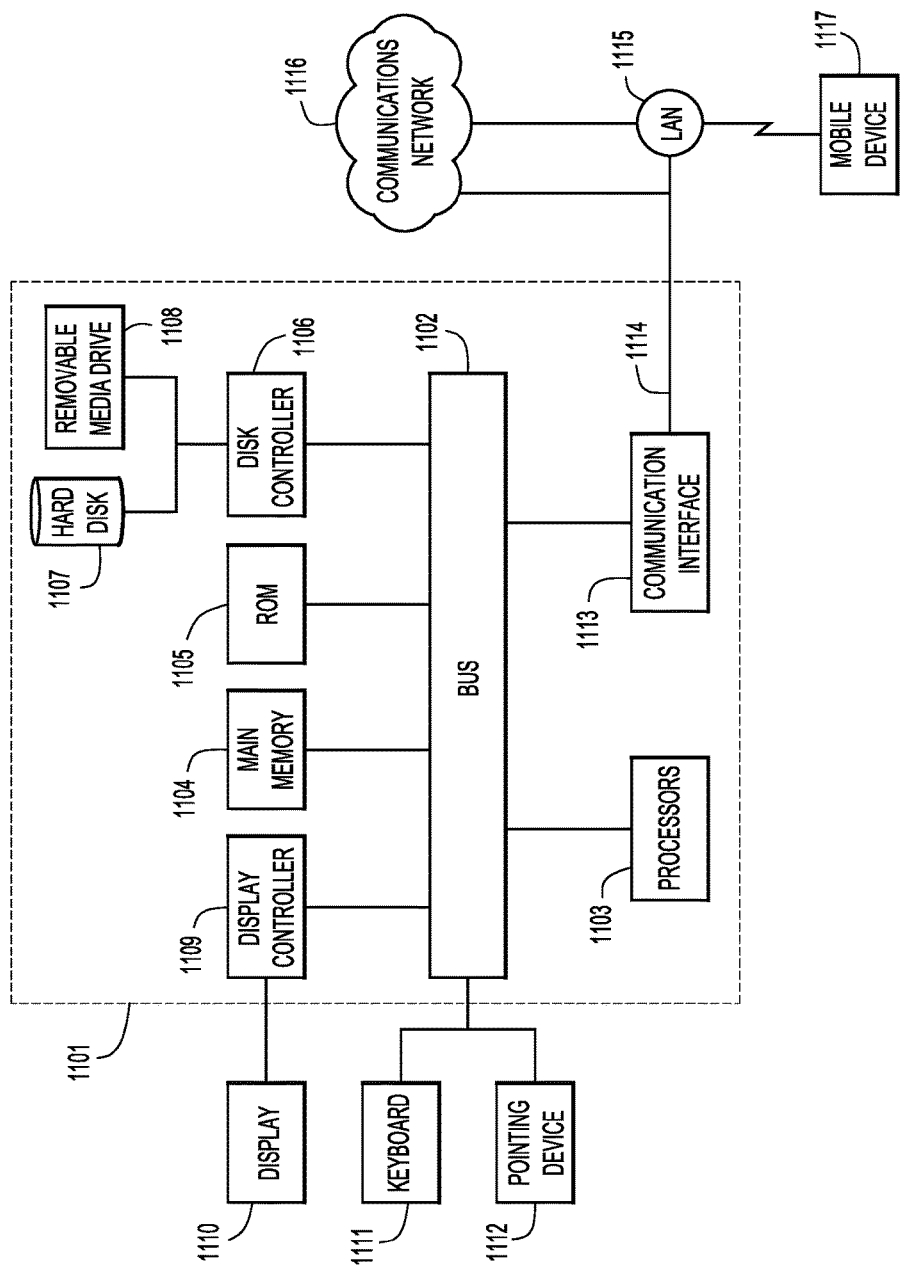
FIG. 11 is a block diagram showing a computing device configured to perform the path segment matching techniques, according to an example embodiment.

FIG. 11 is a block diagram showing a server, e.g., location server 109 shown in FIG. 1, configured to perform the path segment matching techniques, according to an example embodiment. FIG. 7 illustrates a computer system 1101 upon which the embodiments presented may be implemented. The computer system 1101 includes a bus 1102 or other communication mechanism for communicating information, and a processor 1103 coupled with the bus 1102 for processing the information. While the figure shows a signal block 1103 for a processor, it should be understood that the processors 1103 represent a plurality of processing cores, each of which can perform separate processing. The computer system 1101 also includes a main memory 1104, such as a random access memory (RAM) or other dynamic storage device (e.g., dynamic RAM (DRAM), static RAM (SRAM), and synchronous DRAM (SD RAM)), coupled to the bus 1102 for storing information and instructions to be executed by processor 1103. In addition, the main memory 1104 may be used for storing temporary variables or other intermediate information during the execution of instructions by the processor 1103.

The computer system 1101 further includes a read only memory (ROM) 1105 or other static storage device (e.g., programmable ROM (PROM), erasable PROM (EPROM), and electrically erasable PROM (EEPROM)) coupled to the bus 1102 for storing static information and instructions for the processor 1103.

The computer system 1101 also includes a disk controller 1106 coupled to the bus 1102 to control one or more storage devices for storing information and instructions, such as a magnetic hard disk 1107, and a removable media drive 1108 (e.g., floppy disk drive, read-only compact disc drive, read/write compact disc drive, compact disc jukebox, tape drive, and removable magneto-optical drive). The storage devices may be added to the computer system 1101 using an appropriate device interface (e.g., small computer system interface (SCSI), integrated device electronics (IDE), enhanced-IDE (E-IDE), direct memory access (DMA), or ultra-DMA).

The computer system 1101 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1101 may also include a display controller 1109 coupled to the bus 1102 to control a display 1110, such as a cathode ray tube (CRT), for displaying information to a computer user. The computer system 1101 includes input devices, such as a keyboard 1211 and a pointing device 1112, for interacting with a computer user and providing information to the processor 1103. The pointing device 1112, for example, may be a mouse, a trackball, or a pointing stick for communicating direction information and command selections to the processor 1103 and for controlling cursor movement on the display 1110.

The computer system 1101 performs a portion or all of the processing steps of the process in response to the processor 1103 executing one or more sequences of one or more instructions contained in a memory, such as the main memory 1104. Such instructions may be read into the main memory 1104 from another computer readable medium, such as a hard disk 1107 or a removable media drive 1108. One or more processors in a multi-processing arrangement may also be employed to execute the sequences of instructions contained in main memory 1104. In alternative embodiments, hard-wired circuitry may be used in place of or in combination with software instructions. Thus, embodiments are not limited to any specific combination of hardware circuitry and software.

As stated above, the computer system 1101 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1101, for driving a device or devices for implementing the process, and for enabling the computer system 1101 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1101 also includes a communication interface 1113 coupled to the bus 1102. The communication interface 1113 provides a two-way data communication coupling to a network link 1114 that is connected to, for example, a local area network (LAN) 1115, or to another communications network 1116 such as the Internet. For example, the communication interface 1113 may be a wired or wireless network interface card to attach to any packet switched (wired or wireless) LAN. As another example, the communication interface 1113 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1113 sends and receives electrical, electromagnetic or optical signals that carry digital data streams representing various types of information.

The network link 1114 typically provides data communication through one or more networks to other data devices. For example, the network link 1114 may provide a connection to another computer through a local area network 1115 (e.g., a LAN) or through equipment operated by a service provider, which provides communication services through a communications network 1116. The local network 1114 and the communications network 1116 use, for example, electrical, electromagnetic, or optical signals that carry digital data streams, and the associated physical layer (e.g., CAT 5 cable, coaxial cable, optical fiber, etc.). The signals through the various networks and the signals on the network link 1114 and through the communication interface 1113, which carry the digital data to and from the computer system 1101 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1101 can transmit and receive data, including program code, through the network(s) 1115 and 1116, the network link 1114 and the communication interface 1113. Moreover, the network link 1114 may provide a connection through a LAN 1115 to a mobile device 1117 such as a personal digital assistant (PDA) laptop computer, or cellular telephone.

In summary, a method is provided comprising: obtaining location estimates of a wireless mobile device inside a structure based on wireless signals transmitted by the wireless mobile device and received at a plurality of wireless access points, wherein the inside of the structure is represented by a plurality of path segments; modeling a transition from a first estimated location of the wireless mobile device to a second estimated location of the wireless mobile device by minimizing a ratio of an angle to a length between the first estimated location and the second estimated location; selecting, based on the modeling, a particular path segment of the plurality of path segments; and aligning the second estimated location of the mobile device to the particular path segment.

In addition, an apparatus is provided comprising: a communication interface configured to enable network communications; a processing device coupled with the communication interface, and configured to: obtain location estimates of a wireless mobile device inside a structure based on wireless signals transmitted by the wireless mobile device and received at a plurality of wireless access points, wherein the inside of the structure is represented by a plurality of path segments; model a transition from a first estimated location of the wireless mobile device to a second estimated location of the wireless mobile device by minimizing a ratio of an angle to a length between the first estimated location and the second estimated location; select, based on the modeling a particular path segment of the plurality of path segments; and align the second estimated location of the mobile device to the particular path segment.

Furthermore, one or more computer readable storage media encoded with software is provided comprising computer executable instructions and when the software is executed operable to: obtain location estimates of a wireless mobile device inside a structure based on wireless signals transmitted by the wireless mobile device and received at a plurality of wireless access points, wherein the inside of the structure is represented by a plurality of path segments; model a transition from a first estimated location of the wireless mobile device to a second estimated location of the wireless mobile device by minimizing a ratio of an angle to a length between the first estimated location and the second estimated location; select, based on the modeling a particular path segment of the plurality of path segments; and align the second estimated location of the mobile device to the particular path segment.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   obtaining location estimates of a wireless mobile device inside a structure based on wireless signals transmitted by the wireless mobile device and received at a plurality of wireless access points, wherein the inside of the structure is represented by a plurality of path segments;
   modeling a transition from a first estimated location of the wireless mobile device to a second estimated location of the wireless mobile device by minimizing a ratio of an angle to a length between the first estimated location and the second estimated location;
   generating a transition probability representing a probability that the wireless mobile device transitions from a first path segment to a second path segment;
   selecting, based on the modeling and the transition probability, a particular path segment of the plurality of path segments; and
   aligning the second estimated location of the mobile device to the particular path segment.

2. The method of claim 1, wherein the modeling further comprises:
   using a travel distance constraint to determine a length of the shortest path between the first estimated location and the second estimated location to estimate an actual distance traveled by the wireless mobile device.

3. The method of claim 1, wherein the modeling further comprises:
   using a travel time constraint to determine a length of time between the first estimated location and the second estimated location and using the length of time to estimate an actual distance traveled by the wireless mobile device.

4. The method of claim 1, further comprising smoothing the location estimate using a time-based moving average.

5. The method of claim 4, wherein smoothing further comprises:
   smoothing the location estimate using location estimates within a smoothing window, wherein the location estimates comprise an associated timestamp.

6. The method of claim 5, wherein smoothing further comprises:
   weighting a previous location estimate within the smoothing window based on temporal proximity to a current time.

7. The method of claim 1, wherein the modeling further comprises:
   generating an emission probability representing a probability that the wireless mobile device is on a first path segment of the plurality of path segments; and
   maximizing the emission probability and the transition probability.

8. The method of claim 1, wherein the modeling further includes minimizing the ratio of the angle to the length by constraining a number of turns in a shortest path between the first estimated location and the second estimated location.

9. An apparatus comprising:
   a communication interface configured to enable network communications;
   a processing device coupled with the communication interface, and configured to:
      obtain location estimates of a wireless mobile device inside a structure based on wireless signals transmitted by the wireless mobile device and received at a plurality of wireless access points, wherein the inside of the structure is represented by a plurality of path segments;
      model a transition from a first estimated location of the wireless mobile device to a second estimated location of the wireless mobile device by minimizing a ratio of an angle to a length between the first estimated location and the second estimated location;
      generate a transition probability representing a probability that the wireless mobile device transitions from a first path segment to a second path segment;
      select, based on the modeling and the transition probability, a particular path segment of the plurality of path segments; and
      align the second estimated location of the mobile device to the particular path segment.

10. The apparatus of claim 9, wherein the processing device is further configured to model by using a travel distance constraint to determine a length of the shortest path between the first estimated location and the second estimated location to estimate an actual distance traveled by the wireless mobile device.

11. The apparatus of claim 9, wherein the processing device is further configured to model by using a travel time constraint to determine a length of time between the first estimated location and the second estimated location and using the length of time to estimate an actual distance traveled by the wireless mobile device.

12. The apparatus of claim 9, wherein the processing device is further configured to model by generating an emission probability representing a probability that the wireless mobile device is on a first path segment of the plurality of path segments; and maximizing the emission probability and the transition probability.

13. The apparatus of claim 9, wherein the processing device is further configured to minimize the ratio of the angle to the length by constraining a number of turns in a shortest path between the first estimated location and the second estimated location.

14. A non-transitory computer-readable storage media encoded with software comprising computer executable instructions and when the software is executed operable to:
   obtain location estimates of a wireless mobile device inside a structure based on wireless signals transmitted by the wireless mobile device and received at a plurality of wireless access points, wherein the inside of the structure is represented by a plurality of path segments;
   model a transition from a first estimated location of the wireless mobile device to a second estimated location of the wireless mobile device by minimizing a ratio of an angle to a length between the first estimated location and the second estimated location;
   generate a transition probability representing a probability that the wireless mobile device transitions from a first path segment to a second path segment;
   select, based on the modeling and the transition probability, a particular path segment of the plurality of path segments; and
   align the second estimated location of the mobile device to the particular path segment.

15. The non-transitory computer-readable storage media of claim 14, wherein the instructions operable to model comprise instructions operable to use a travel distance constraint to determine a length of the shortest path between the first estimated location and the second estimated location to estimate an actual distance traveled by the wireless mobile device.

16. The non-transitory computer-readable storage media of claim 14, wherein the instructions operable to model comprise instructions operable to use a travel time constraint to determine a length of time between the first estimated location and the second estimated location and using the length of time to estimate an actual distance traveled by the wireless mobile device.

17. The non-transitory computer-readable storage media of claim 14, further comprising instructions operable to smooth the location estimate using a time-based moving average.

18. The non-transitory computer-readable storage media of claim 17, wherein the instructions operable to smooth comprise instructions operable to smooth the location estimate using location estimates within a smoothing window, wherein the location estimates comprise an associated timestamp.

19. The non-transitory computer-readable storage media of claim 14, wherein the instructions operable to model comprise instructions operable to generate an emission probability representing a probability that the wireless mobile device is on a first path segment of the plurality of path segments; and maximize the emission probability and the transition probability.

20. The non-transitory computer-readable storage media of claim 14, wherein the instructions operable to model comprise instructions operable to minimize the ratio of the angle to the length by constraining a number of turns in a shortest path between the first estimated location and the second estimated location.

* * * * *